US006826598B1

(12) United States Patent
Titmuss et al.

(10) Patent No.: US 6,826,598 B1
(45) Date of Patent: Nov. 30, 2004

(54) STORAGE AND RETRIEVAL OF LOCATION BASED INFORMATION IN A DISTRIBUTED NETWORK OF DATA STORAGE DEVICES

(75) Inventors: Richard John Titmuss, Ipswich (GB); Alan Richard Brookland, Ipswich (GB); Delphine Plasse, Ipswich (GB); Robert Peter Moore, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/647,884

(22) PCT Filed: May 5, 1999

(86) PCT No.: PCT/GB99/01394

§ 371 (c)(1),
(2), (4) Date: Oct. 6, 2000

(87) PCT Pub. No.: WO99/57700

PCT Pub. Date: Nov. 11, 1999

(30) Foreign Application Priority Data

May 5, 1998 (EP) ........................................... 98303520
May 5, 1998 (GB) ........................................... 98009600

(51) Int. Cl.[7] ............................................ G06F 15/167
(52) U.S. Cl. ....................... 709/212; 709/216; 709/217; 709/218; 709/219
(58) Field of Search ................................ 709/203, 212, 709/216, 217, 218

(56) References Cited

U.S. PATENT DOCUMENTS

| | | | | |
|---|---|---|---|---|
| 4,972,319 A | | 11/1990 | Delorme | |
| 5,448,696 A | | 9/1995 | Shimada et al. | |
| 6,049,711 A | * | 4/2000 | Ben-Yehezkel et al. .. | 455/414.3 |
| 6,108,533 A | * | 8/2000 | Brohoff ................... | 455/414.3 |
| 6,157,841 A | * | 12/2000 | Bolduc et al. ........... | 455/456.5 |

FOREIGN PATENT DOCUMENTS

| | | | | |
|---|---|---|---|---|
| EP | 0436263 A1 | 7/1991 | | |
| EP | 0 718 784 B1 | 6/1996 | | |
| EP | 0798539 A2 | 10/1997 | | |
| GB | WO 98/47295 | * 10/1998 | | |
| WO | 93/01665 | 1/1993 | | |
| WO | 94/30023 | 12/1994 | | |
| WO | WO 96/07110 | 3/1996 | | |
| WO | WO 9607110 A1 * | 3/1996 | ............. | G01S/5/14 |
| WO | 96/25012 | 8/1996 | | |
| WO | 97/37500 | 10/1997 | | |
| WO | 98/47295 | 10/1998 | | |

OTHER PUBLICATIONS

POIX: Point of Interest exchange Language Specification by Kanemitsu et al.; W3C Note–Jun. 24, 1999; pp. 1–25.*

(List continued on next page.)

*Primary Examiner*—Frantz B. Jean
(74) *Attorney, Agent, or Firm*—Nixon & Vanderhye P.C.

(57) ABSTRACT

A method of storing and/or retrieving location-based information comprises: storing, in a distributed network of data storage devices accessible simultaneously from a plurality of remote user terminals, data defining a plurality of first localities in relation to which information storage is accessible, and selecting ones of the first localities to represent second localities for which information is to be stored and/or retrieved such that i) the first and second localities bear a predetermined locational relationship, and ii) the first and second localities bear a predetermined relationship in size.

25 Claims, 10 Drawing Sheets

OTHER PUBLICATIONS

Ishikawa et al, "Map Navigation Software of the Electro–Multivision of the '91 Toyota Soarer", Proceed of the Vehicle Navigation and Information Systems Conference, Dearborn, Oct. 20, 1991, vol. 1, pp. 463–473, XP000347114 Institute of Electrical and Electornics Engine ISBN; 0–7803–0488–8.

Chang, et al, "Pictorial Database Systems", COMPUTER, vol. 14, No. 11, Nov. 1, 1981, pp. 13–21, XP002078619, ISSN: 0018–9162.

W3C Website, entitled "POIX: Point of Interest eXchange Language Specification", Jun. 24, 1999.

Zhang, et al, "A Client/Server Approach to 30 Modeling Support System for Coast Change Study", GIS/LIS '96 Annual Conf. and Exposition Proc., Proc. of Geographic Information Systems/Land Information Systems, Nov. 19–21, 1996, pp. 1265–1274, XP002111059.

* cited by examiner

STORAGE AND RETRIEVAL OF LOCATION BASED INFORMATION IN A DISTRIBUTED NETWORK OF DATA STORAGE DEVICES

BACKGROUND

1. Technical Field

This invention relates to the location-dependent storage and retrieval of information. The invention also relates to apparatus and methods for transmitting information to mobile and roaming users in a telecommunications system.

2. Description of Related Art

In conventional telecommunications, a given user is associated with a given telecommunications terminal (e.g. a conventional telephone, or a computer with a modem, or a facsimile unit). However, more recently, users have become mobile. In addition to mobile telephones (for example digital cellular telephones such as those conforming to the GSM standard) other types of portable terminal include pagers (either tone pagers or message pagers which can receive short textual messages and display them); so called "personal digital assistants" (PDA's) and portable facsimile or computer units adapted to communicate via cellular networks using dedicated modems. Users may also move to and from fixed terminals.

At the same time, the volume and types of formats of information which can be transmitted is increasing, and new, so called "multi-media" formats, consisting of single sets of information presented in multiple media (such as for example image, text and audio files) are entering use. An increasing volume of such information is available via the World Wide Web ("the Web").

The telecommunications channels through which information is delivered comprise channels of varying bandwidth, including optical fibre links; coaxial copper links; conventional subscriber telephone lines; infra-red local area networks; and radio frequency channels. Of these, radio frequency channels especially are used for mobile communications, although in certain areas infra red links are possible. However, radio frequency channels which are used in mobile communications generally have available the lowest bandwidth due to demands on the RF spectrum and to the channel conditions within the RF spectrum. Thus the amount of information which a mobile user on a radio frequency link can currently receive and select from is relatively limited.

European patent application EP-A-0718784 describes a system for retrieving information based on a user-defined profile. A server acting on behalf of the client identifies information on the basis of the user-defined profile, to generate a personalised newspaper which is delivered to the user. This provides for an automatic sorting of the large volume of data available on the World Wide Web to generate a subset of the information available which is tailored to a users specific interest. However, the system is only used for providing a personalised newspaper delivered in electronic form to a static user.

International patent publication No WO94/30023 describes a GSM telecommunications system whereby data records may be downloaded onto subscriber identity modules in the system by broadcasting the data to a subscriber. The distribution of messages to subscriber identity modules in a specific area is possible, for example for advertising purposes. However, only a limited amount of data can be broadcast in such a manner for storage on the subscriber identity modules.

International patent publication No W093/01665 describes a telecommunications system in which mobile users are able to receive localised information data from base stations in the system. Each base station is provided with a localised information database, containing information pertaining to the local area, which can be received by a mobile user being served by the base station on request. The user is able to download selected portions of the information contained in the localised information database by stating selections on a mobile terminal. However, the amount of information available to the user is limited to that stored in the localised information database. furthermore, all mobile users in a cell receive the same information, and the information is localised only to the extent that the base stations are separated.

International patent publication no. WO96/07110 describes a navigation information system whereby route guidance information, or possibly other locality-dependent information, may be provided to a user of a cellular telephone network. The user, on requesting service, identifies a destination, which a server specifically allocated to that user uses to formulate a route. The cellular telephone of the user automatically signals tracking information to the server as the user travels. When the user's position falls within predefined "overlay areas", messages directing the user along the route are automatically generated and transmitted the cellular telephone of the user. This document describes the possibility of providing other locality-dependent information, such as information about local facilities, tourist attractions, weather forecasts and public transport information.

Our earlier international application PCT/GB96/00252, published 15 Aug. 1996, describes a multimedia telecommunications system employing reconfigurable agents. Aspects of this document are incorporated herein by reference.

Our earlier international application PCT/GB97/00890, published 9 Oct. 1997, describes a telecommunication system in which a user is tracked, and the identity of a terminal which he may at any time be using is stored. The capabilities (i.e. formats in which signals can be accepted and/or output) of terminal equipment in the vicinity of the user is stored. Therefore, rather than attempting (unsuccessfully) to deliver a high bandwidth signal to a low bandwidth mobile terminal, the system directs the signal to a nearby terminal which can support a better representation of the signal. The nearby terminal may accept and output the signal in its original form, or the network may convert the signal to a different format which can be accepted by the nearby terminal.

Our earlier international application PCT/GB98/01056, published 22 Oct. 1998, describes a telecommunications system in which a location directory stores location-dependent data identifying information sources which are associated with individually defined localities. The data is accessed by a personal agent which filters the data using preference data and presents a shortlist of information sources which are relevant in the locality of the user.

A paper entitled Knowledge and Location, Isabel Novoa, Mark Wilby, presented at International Joint Conference on Artificial Intelligence, Montreal, 1995, describes a model for the management of information in a distributed environment. The model proposed is a flexible addressing system based on a tree-like nodal network, representing a distributed database. In order to locate information within the database, routing information is provided by nodes within the network. If a node receives a request for routing information, it first checks a database local to the node to determine whether the requested information is present. If not, the request is passed to a parent of the node. If the information is present, the routing request may be passed to a destination child node whereby eventually the address required is found. The system is implemented in order to allow disassociation between the address of a mobile user, and the routing information whereby the address may be accessed.

BRIEF SUMMARY

In accordance with one aspect of the invention there is provided a method of storing and/or retrieving location-based information, the method comprising:

storing, in a distributed network of data storage devices accessible simultaneously from a plurality of remote user terminals, data defining a plurality of first localities in relation to which information storage is accessible; and selecting ones of said first localities to represent second localities for which information is to be stored and/or retrieved such that:

i) said first and second localities bear a predetermined locational relationship; and ii) said first and second localities bear a predetermined relationship in size.

This aspect allows the level of generality of information being stored and/or retrieved, by means of the accessible information storage, to be appropriate to the second localities. The second localities may on the one hand be a locality of interest, where information is to be retrieved, or on the other hand, a locality of pertinence, where the information is to be stored.

In accordance with a further aspect of the invention there is provided a method of storing location-based information, the method comprising:

defining, in a distributed network of data storage devices accessible simultaneously from a plurality of user terminals, a plurality of data access nodes each of which is responsible for a predefined locality, said plurality of nodes including a higher level node responsible for a larger locality and lower level nodes responsible for smaller localities which overlap said larger locality, indexing references to information sources containing locality-specific information at said data access nodes, different information source references being indexed at said higher level node than at said lower level nodes; and transmitting said references from said data access nodes on request.

In accordance with a yet further aspect of the invention there is provided a method of storing location-based information, the method comprising:

defining, in a distributed network of data storage devices accessible simultaneously from a plurality of user terminals, a plurality of data access nodes each of which are responsible for a predefined locality;

indexing references to information sources containing locality-specific information at said data access nodes, one or more of such references being repeatedly indexed at different of said nodes; and transmitting said references from said data access nodes on request.

With different information source references indexed at higher level nodes than at lower level nodes, different references may be accessed in dependence on the locational generality of the information required.

With information source references repeatedly indexed at different of the nodes, it is possible to ensure that information sources of a given locality of pertinence are appropriately indexed in relation to various fixed levels and/or localities.

In accordance with a further aspect of the invention there is provided a method of retrieving information for presentation to a user, the method comprising:

defining a locality of interest to the user in dependence on both a location of the user and a speed of travel of the user; and selecting, in a distributed network of data storage devices accessible simultaneously from a plurality of user terminals, information sources from which locality-specific information may be retrieved, on the basis of the defined locality of interest.

By taking into account the speed of travel of the user in defining the locality of interest when selecting information sources, it is possible to prevent the user being overwhelmed with large quantities of information when travelling at a relatively high speed, whilst providing the user with sufficient specificity of information when stationary or travelling at a low speed.

Furthermore, relatively remote locations of interest which are predicted to be of interest to the user on the basis of the user's speed may be included in the locality of interest.

BRIEF DESCRIPTION OF THE DRAWINGS

Further aspects, features and advantages of the present invention will be apparent from the following description of preferred embodiments of the invention, which is by way of example only and which refers to the accompanying drawings, in which.

DETAILED DESCRIPTION OF EXEMPLARY EMBODIMENTS

Figure 1:
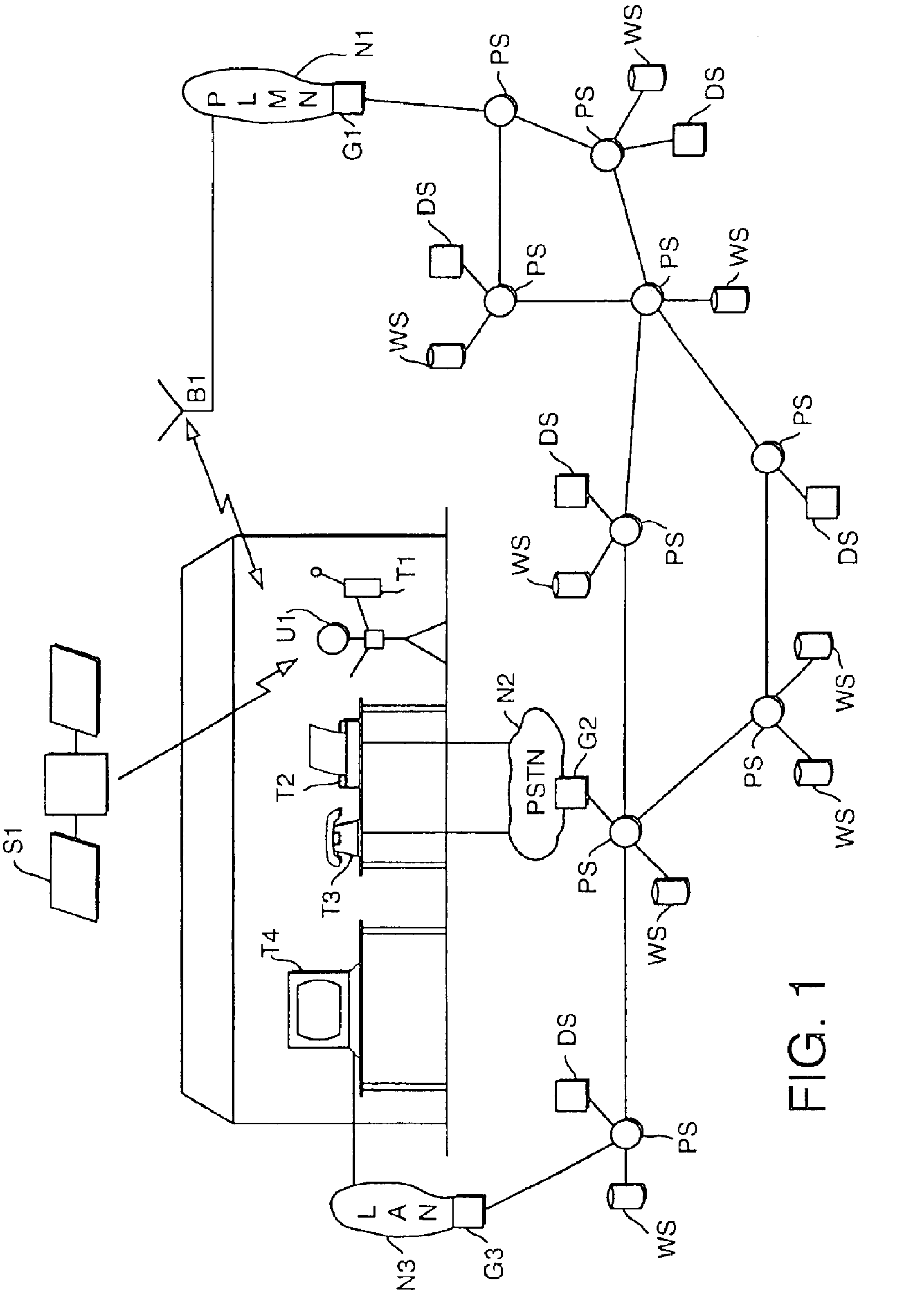
FIG. 1 is a schematic diagram illustrating the physical, or transport, layer of a telecommunications system.

Referring to FIG. 1, at the physical or bearer level the telecommunications environment of a user U1 in a particular locality comprises a cellular telephone, or a personal digital assistant, T1 which may include a Global Positioning System Receiver and which is carried by the user; a facsimile apparatus T2 and conventional telephone T3; and a computer workstation T4.

The various terminals T1–T4 are each capable of receiving different signal formats, as follows:

T1—voice or low bit rate data.

T2—facsimile image signals.

T3—narrow bandwidth audio.

T4—high bit rate data in various formats or any of the above.

In communication with the various terminals are a number of different communications channels forming parts of different notional networks (although some or all may be commonly owned).

A public land mobile network (PLMN) (e.g. a GSM—compatible digital cellular network) N1 is connected via a base station B1 of the PLMN and a radio interface to terminal T1. The base station B1 provides a cell in the environment of the area within which the user U1 is located.

A public switched telephone network (PSTN) N2 is connected via a local line to terminal T3, and via a local line to terminal T4.

A local area network (LAN) N3, including a LAN server is connected via a data link to terminal T3. Further terminals (not shown) at different distances from the user are also connected in the LAN.

The user U1 carries an identifying device interacting with a location update device via which his position within the telecommunications environment may be tracked. For example, in this embodiment the identifying device comprises a chip carrying card or "smart card" carrying data identifying the user, and some or all of the terminals T1–T4 carrying a location update device in the form of a card reader arranged to read the card. Alternatively, it could comprise a 'smart badge' transponder, the location of which is tracked automatically.

Specifically, the terminals T1–T4 may carry such smart card readers to signal tracking information via the networks to which they are connected. Additional smart card readers are installed at access points to a building or area, and are connected, for example to the LAN N3, to signal a user's location.

Further, preferably, the terminal T1 comprises, in addition to cellphone communicating components, a location update device in the form of a global positioning system (GPS) receiver and is arranged to derive and signal its position, speed and direction from a GPS satellite S1 periodically as disclosed in EP 0467651 (Motorola). Alternatively, the cellphone T1 could perform positioning additionally using a land-based positioning signal, such as by differential GPS positioning, or purely using land-based positioning signals, such as differential GSM triangulation signals as described in WO 96/35306 (Telecom Securicor). The terminal T1 signals the user's location, speed and direction via PLMN N1.

Thus, the position of the user U1 is signalled by one or more of several means; firstly, it may be signalled from the terminal at which he has logged in, for example by password and/or by the insertion of his smart card; secondly, his geographical position may be signalled from a positioning signal receiver; and thirdly, his position within a building or area may be signalled from the access system. His speed and direction may also be signalled from the positioning signal receiver. Alternatively, the user can communicate his location by calling using T1 or T2, in which case he may be identified by Calling Line Identity (CLI).

Each of the networks N1–N3 is connected, via gateways G1–G3 respectively, to a wide area network (WAN), such as the Internet, consisting of packet switches PS interconnected by high speed data links, such as asynchronous transfer mode (ATM) links.

The WAN provides connections, via the packet switches PS, to distributed information servers, such as Web servers WS, containing multi-media information sources, such as Web pages. The WAN also provides access to distributed processing environment (DPE) Servers DS, which are connected to and distributed between the packet switches PS of the WAN.

The DPE Servers DS provide a distributed processing environment (DPE) which supports the interaction of software objects. The communication between the objects may be handled by object request brokers (ORBs), such as provided by the object management group's common object request broker architecture (CORBA). Furthermore, the DPE Servers DS provide for persistent storage of the software objects held therein. This may be provided for example by ObjectStore's PSE (persistent storage engine) PRO (trademark).

Each of the DPE Servers DS stores intelligent software agents, as discussed in further detail below.

For the reasons described in the above referenced prior art, it is advantageous to employ a so called "agent based" control mechanism. The term "agent" has in the past been used with a number of different senses; here, except where the context makes it clear that this is unnecessarily limiting, it will be understood to mean an independently executing control program under control of which a computer or computer controlled switching centre performs the functions attributed to the "agent". The term is not necessarily limited to control programs which monitor their environment and adapt their behaviour and response thereto, but encompasses such programs.

Each agent makes use of data, and it is convenient that the agents should therefore operate in "object-oriented" fashion; that is to say, that the data should be "encapsulated" so as to be accessible and alterable only by associated control programs, acting in response to "messages" (which need not, however, be physically transmitted but could simply be data passed via the stack of a single computer). The agents are embodied by a mobile agent software system, such as IBM's "Aglets" (trademark) system, ObjectSpace's "Voyager" (trademark) system or suchlike. A discussion of mobile agents may also be found in "Mobile Agents", Lecture Notes in Computer Science, Rothermal K. Popescu-Zeletin Eds., First Int. Workshop, MA '97, Berlin, April 1997.

Being mobile, the agents are able to access information either remotely, via the data links described, or locally, by moving themselves to the location of the information.

It will, however, be understood that the use of mobile agents and the object oriented format is inessential to the invention.

Figure 2:
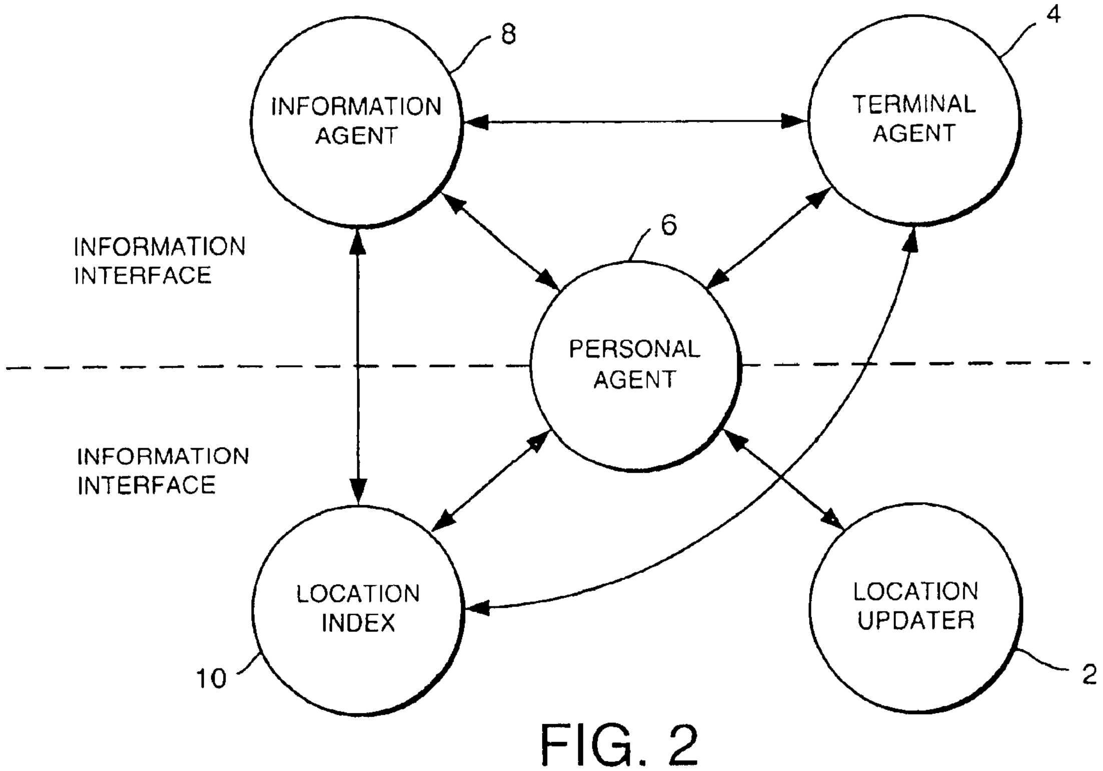
FIG. 2 is a schematic diagram illustrating the system architecture for control components used in an apparatus of the present invention.

Referring to FIG. 2, the software architecture of the system includes a location updater object class 2, a terminal agent object class 4, a personal agent object class 6, an information agent object class 8 and a location index object class 10.

Each user in the system has a personal agent operating in the system on its behalf. Each information source in the system has at least one information agent operating in the system on its behalf. Each location update device in the system has a location updater object operating in the system on its behalf and to which its location updating signals are transmitted. Each terminal in the system has a terminal agent operating in the system on its behalf through which the terminal interacts with the distributed processing environment. Finally, a location indexing network has location index objects operating on its behalf.

Each agent and each of the location index objects includes a software code which is stored in the system. The relative locations of the agents within the system is not critical, since the agents are accessible by means of the networks N1–N3. However, in an advantageous arrangement, at least some of the terminal agents 4 may be located on the respective terminals they represent and the location updaters may be held on a DPE server DS at the point of receipt of the location updating information sent via one of the networks N1–N3. The personal agents 6 and information agents 8 may be located on DPE servers holding the respective nodes of the location index with which they are interacting, as will be described in further detail below.

Each personal agent has data storage attributes for storing the following data:

1. Its user's preference data, including preferred categories of data to be accessed, age, gender, state of health, friends, interests, language preferences, information format type preferences, dynamic update preferences, location-based preferences, time/date-based preferences, cost limits on information retrieval, wildcard key words, etc.
2. An item details list detailing information sources, terminals offering service and users present in the current locality of the user.
3. A shortlist of selected item details already presented to the user.
4. System addresses of the user's personal terminals.
5. The identity of the terminal currently being used by the user.
6. The current location of the user.
7. The speed and direction in which the user is currently travelling.
8. An alternative location of interest to the user.
9. A selection algorithm for filtering information by reference to the user's preference data.

The personal agent 6 interfaces with each of the location index, information agents 8, terminal agents 4 and location updater 2 as will be described below.

The information agent has data storage attributes for storing an item details object for the information source, to be described further below.

The terminal agent 4 has attributes for containing the following data:

1. The system address of the terminal.
2. The system address of the personal agent of the current terminal user.
3. A shortlist of item details sent to the terminal by the current personal agent.
4. The system address of the currently selected information source, if any.
5. An item details object for the terminal, to be described in further detail below.
6. A list of allowable input and output file formats.
7. A list of file format translations which the terminal agent supports.

The location updater 2 has data storage attributes for containing the following data:

1. The current location, and speed and direction if appropriate, of the corresponding location update device, such as the GPS receiver.
2. The identities of users, and the system addresses of their personal agents, being serviced by the location updater (multiple users if the location update device is fixed, single user if the location update device is mobile).

Each location index object derived from the location index object class 10 forms a node of an indexing network, interconnected with related nodes of the indexing network.

Each node of the index has a locality index for storing item details objects to be indexed on a locality basis, and a name index for storing item details objects and pointers to item details objects to be indexed by the name of the agent concerned. In addition, each node is provided with the following set and stored attributes:

1. A locality of responsibility (LOR), specified in the form of Cartesian coordinates for its centre and parameters defining its size and shape.
2. A predefined level within the indexing network. The indexing network includes a root node at level 1, responsible for a large locality, and subnodes at levels 2 and above, responsible for localities which form sub-localities of that of the root node, and that of nodes above their level in the indexing network. It is to be noted that, herein, "higher" level nodes have numerical designations which are smaller than that of "lower" level nodes.
3. References to nodes to which the node is related in the network, including one or more of parent nodes, children nodes, sibling nodes, uncle nodes, nephew nodes and cousin nodes.

Location index objects having different, and in particular spaced, localities of responsibility are stored on different of the DPE servers DS to allow very large scale scalability, by having a large number of DPE servers each handling a fraction of the data storage and retrieval operations of the system.

Figure 3:
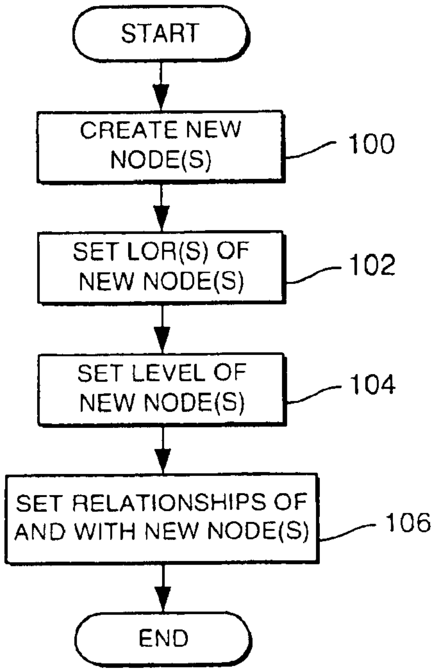
FIG. 3 is a flow diagram illustrating the creation of an indexing network in accordance with the present invention.

In order to create, or alter, an indexing network, new nodes are created at a particular level, and their attributes are set in accordance with data specified by a party responsible for the indexing network itself, as illustrated in FIG. 3.

As a first step, the new nodes are instantiated, step 100. The new nodes are then defined within the indexing network by setting their locality of responsibility (LOR), step 102, setting their level within the network, step 104, and setting the relationships of the new node and setting references to the new node in the previously existing nodes in accordance with their relationship within the network, step 106. The relationships are set by a new node querying its parent for the various adjacent relations which include contenders for relations of the new node. The LORs of the nodes returned by the parent are analysed by the new node in order to decide whether to connect to them, in which case the new node stores the adjacent node in its relations database. It also informs the related node of its presence in order to establish reciprocal connections.

An indexing node network is constructed by functionality provided in the location index object class by use of the following rules set:

1. If no tree currently exists, create a root node at level 1, by instantiating an instance of the location index object class.
2. If a node has a LOR which is itself insufficiently small for certain location-specific information, or if the node has a current processing load which exceeds a set threshold, create one or more nodes which are responsible for sub-localities of the locality for which that particular node, referred to herein as the splitting node, is responsible. If a plurality of new nodes which are adjacent are created, interconnect the new nodes via a sibling relationship, with the splitting node as their parent. Set each new node within the indexing network to the level of their parent, plus 1.
3. If the splitting node has siblings or cousins, compare each new child node with the splitting node's siblings and cousins. If the localities of responsibility by the two nodes being compared are adjacent, create an uncle/nephew link between them. Set the depth of the relationship, being the comparative levels of the nodes, to 1.

4. If the splitting node has one or more uncles, compare each new child node with each of the splitting node's uncles. If the localities of responsibility covered by the two nodes being compared are adjacent, create an uncle/nephew link between them. Set the depth of the link equal to the depth of the matching uncle relationship, plus 1. These related nodes are referred to herein as great-uncles.
5. If the splitting node has one or more nephews with depths N where N>1, being a great-uncle/nephew relationship, compare the locality of responsibility set for each new child node with that of the splitting node's nephews. If the two nodes are adjacent, set an uncle/nephew link between them with a depth of N−1.
6. If the splitting node has one or more nephews with depth 1, compare the locality of responsibility of each new child node with that of each of the splitting node's nephews. If the areas covered by the two nodes are adjacent, create a cousin link between them.

The operation of these rules is illustrated with reference to FIGS. 4 to 6.

Figure 4A:
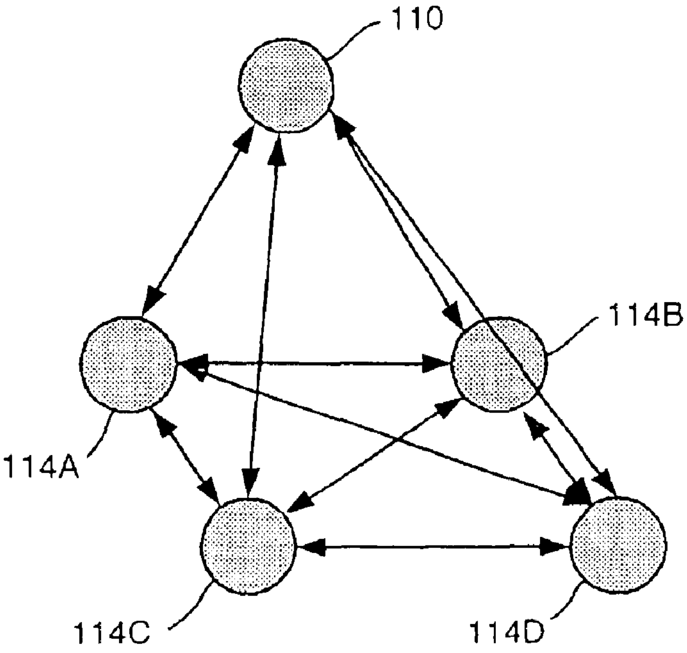
FIGS. 4A, 5A and 6A illustrate an indexing network in creation.
Figure 4B:
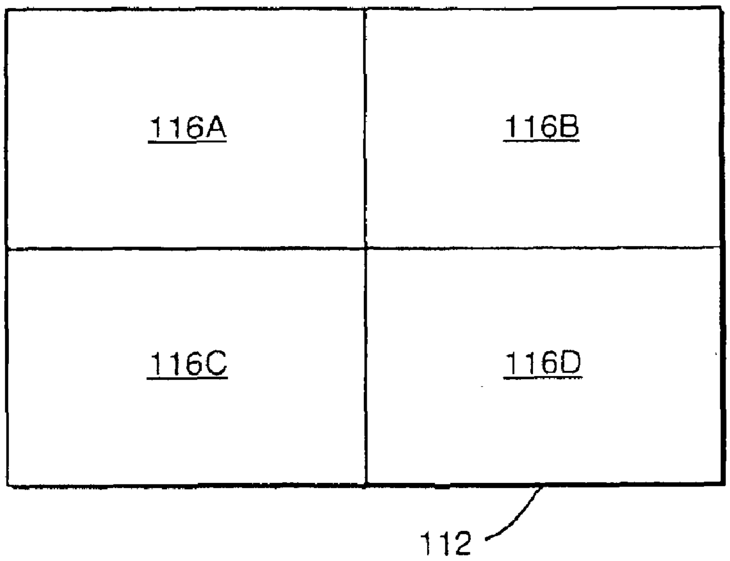
FIGS. 4B, 5B and 6B illustrate localities of responsibility corresponding with the indexing nodes illustrated in FIGS. 4A, 5A and 6A.

Referring to FIG. 4A, which illustrates an indexing network at an early stage in creation, the indexing network includes a root node 110 which has a locality of responsibility corresponding to the entire geographical coverage of the indexing network, illustrated in FIG. 4B as outer rectangle 112. The network level of the root node 110 is 1. The root node 110 only has children relationships.

The child no des 114 each have a locality of responsibility which forms a subset of the locality of responsibility of the root node 110, illustrated by inner rectangles 116A, 116B, 116C, 116D in FIG. 4B. The child nodes are created using rule 2 described above applied to the root node 110.

Figure 5A:
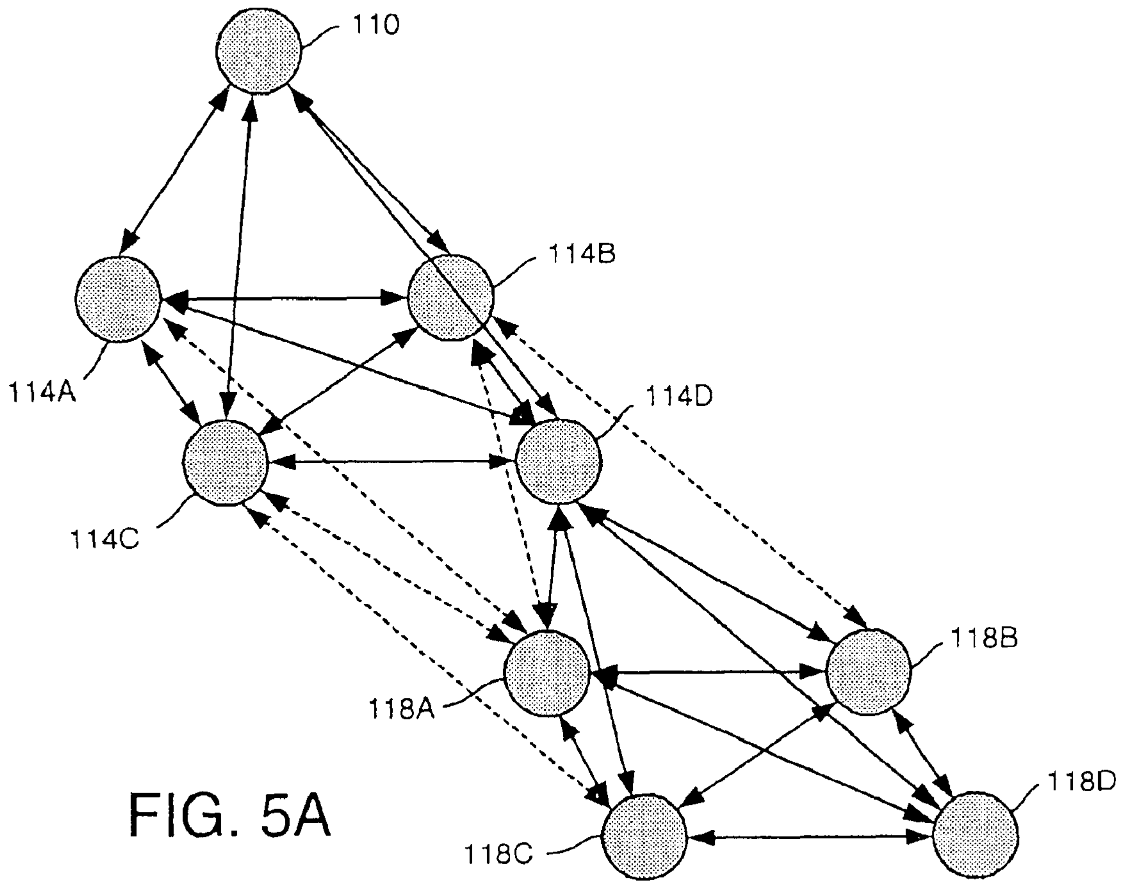

Referring to FIG. 5A, one of the child nodes 114D may be split to provide further child nodes 118A–D, which are grandchildren of the root node 110. The new child nodes 118A–D have localities of responsibility which form sub-localities 120A–D of the locality of responsibility 116D of their immediate parent node 114D, and consequently also form sub-localities of the locality of responsibility 112 of the higher level node 110.

The relationships of the new nodes 118A–D are set by defining sibling relationships between each of the new nodes 118A–D, parent/child relationships with the parent node 114D, and, where the localities of responsibility 120A–D of the new nodes 118A–D are adjacent to the localities of responsibility of higher nodes in the network, uncle/nephew relations are set by references to those higher level nodes 114A–C. These uncle/nephew relationships are set in accordance with rule 3 above.

Figure 6A:
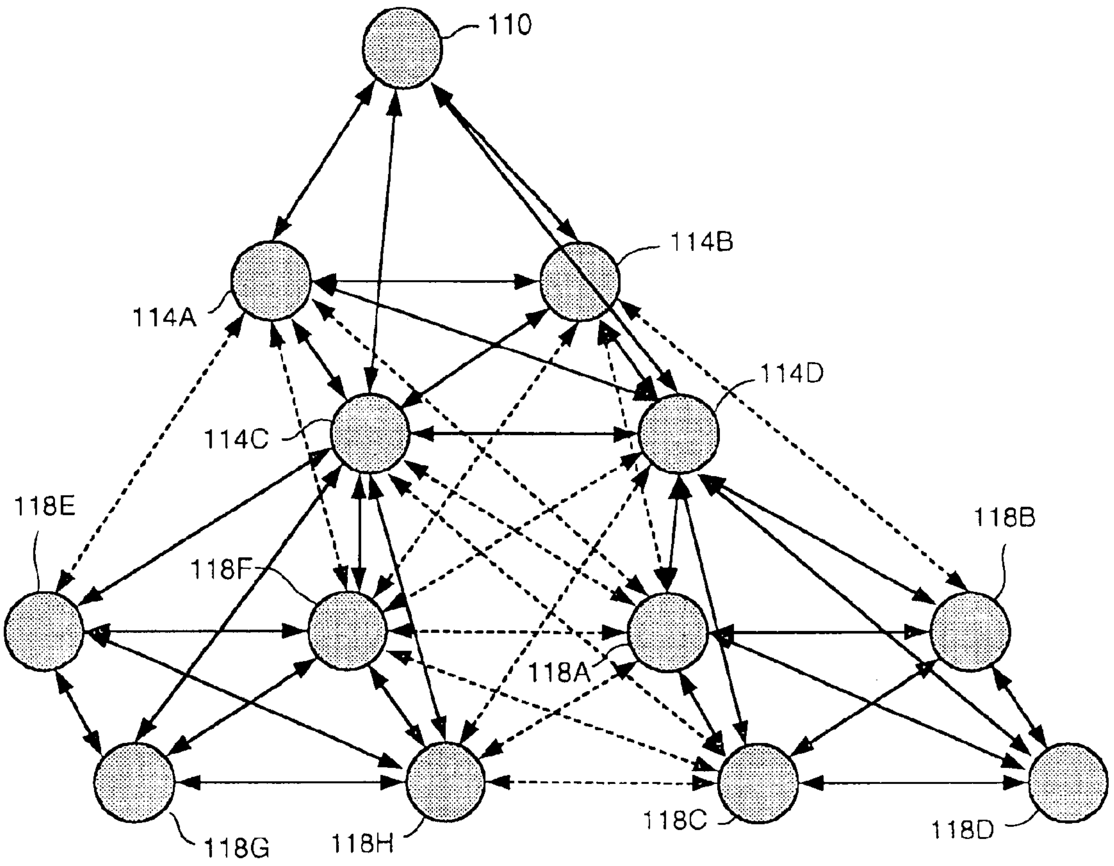
Figure 6B:
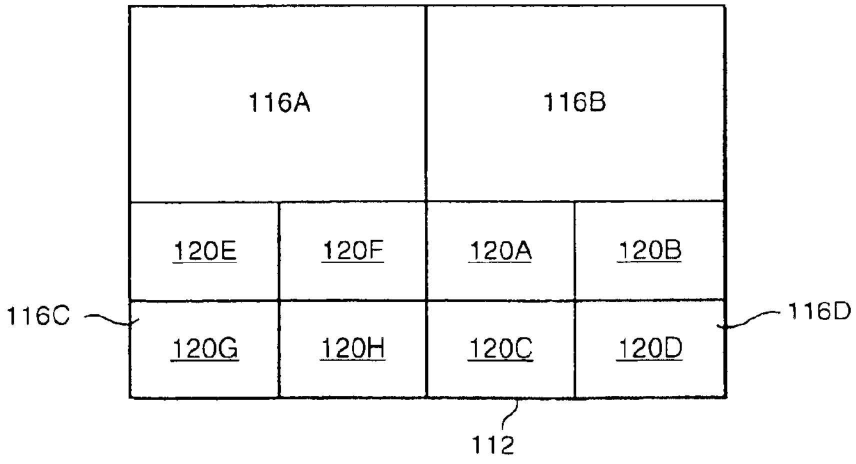

Referring to FIGS. 6A and 6B, a node 114C adjacent to the previously split node 114D may also be split to produce four new children nodes 118E–H. These new children nodes have localities of responsibility which are set to be sub-localities of the locality of responsibility 116C of their immediate parent node 114C. Their level in the network is set at 3, in accordance with rule 2 above. Their relationships within the indexing network include parent/child relationships with the parent node 114C, uncle/nephew relationships with nodes 114A, B D at the same level as their parent node 114C and sibling relationships between each of the new nodes 118E–H. In addition, the new nodes 118E–H which have localities of responsibility 120E, 120F, 120G, 120H which adjoin the localities of responsibility of the previously created nodes 118A, C at the same level are defined to have cousin relationships with those previously created nodes, in accordance with rule 6 above.

In each of FIGS. 4A, 5A and 6A, parent/child relationships are illustrated with bold, solid, arrowed lines. Sibling relationships are illustrated with solid, arrowed lines. Uncle/nephew relationships are illustrated with closely spaced dashed, arrowed lines. Cousin relationships are illustrated with spaced dashed, arrowed lines.

FIGS. 4 to 6 illustrate the principle of construction, and the division of the localities of responsibility of an indexing network, by means of nodes at a plurality of levels below the root node level. As the network is increased further in depth, the localities of responsibility for nodes defined at each next lower level becoming progressively smaller, such that the indexed information, to be described below, at each node becomes increasingly location-specific. This structure allows agents interacting with the indexing network to index information at a certain level of location specificity, and to obtain information at a certain level of location specificity, to thereby provide a level of detail appropriate to the information storage act or information retrieval act being performed.

Figure 5B:
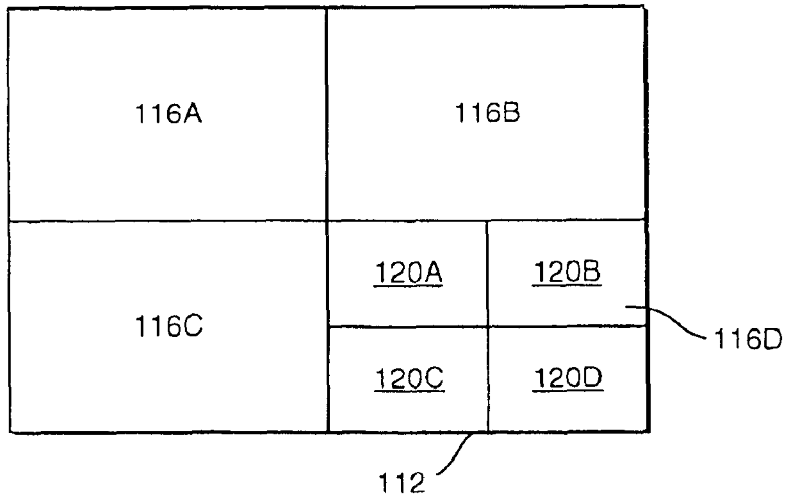

It is to be understood that the rectangular localities of responsibility illustrated in FIGS. 4B, 5B and 6B are examples only. The localities may be defined as other two dimensional shapes, and may also be defined as three dimensional volumes. The node splitting procedures may also have different, or variable, cardinalities.

Figure 7:
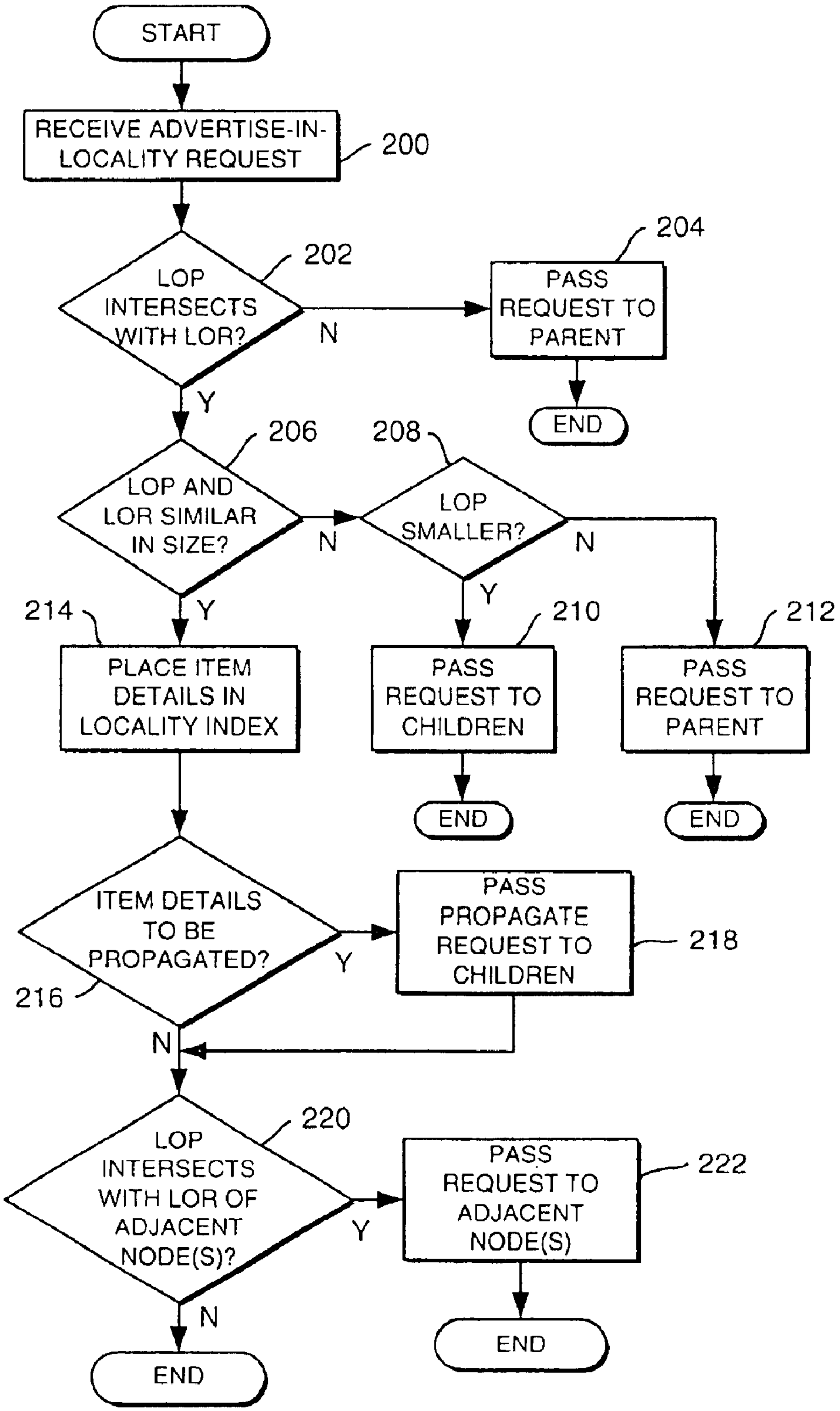
FIGS. 7 to 10, 12 and 13 are flow diagrams illustrating functionality provided at individual nodes of the indexing network in accordance with the present invention.

FIG. 7 is a flow chart illustrating the functionality provided at each node, by the location index object class, for allowing information agents to index location-specific data in the nodal network.

Each information source has a node in the indexing network with which the information agent is set to interact, referred to herein as a gateway node. In order to index an information source for which the information agent is acting, the information agent transmits an advertise-in-locality request to its gateway node, passing across its item details object with the advertise request.

The item details object held in an information agent includes:

1. The gateway node at which the information agent is currently set to communicate with the indexing network.
2. The name of the information source.
3. Data specifying a locality of pertinence (LOP) of the information held on the information source for which the information agent is acting. The locality is specified in the form of Cartesian coordinates and parameters defining its size and shape.
4. Meta-information concerning the information stored in the information source, including a list of the files contained in the information source, format identifiers (for example Multipurpose Internet Multimedia Extension (MIME) records), the sizes of the files, the language (for example English) of a text file, encoding identifiers, a best before date and a priority indication indicating the relative importance of the respective files in the information source.
5. The system address of the information source. In the case of an information source in the form of a Web page, this consists of a Uniform Resource Locator (URL).

When an advertise-in-locality request is received, by a node, step 200, the node applies a heuristic function method to the LOP in the passed item details object, to determine whether the LOP intersects with its locality of responsibility of the node, step 202. If there is no intersection, the node passes the request, along with the item details object, to its parent node, step 204.

If the LOP and the LOR are found to intersect, the node proceeds to apply a further heuristic function to determine whether the LOP of the information source and the LOR of the node are similar in size, step 206. Here, "similar in size" includes a range of similarity in size, which is dependent primarily on the interval in size between the LORs of nodes at different levels in the indexing network. For example the similarity function may be arranged such that the size of the LOP may range from midway between the size of the node's LOR and the size of the LOR of the parent node down to midway between the size of the node's LOR and the size of the LOR of the child node of the node in question in order for the LOP and LOR to be considered similar in size. Thus, where child nodes are formed by quartering in an indexing network, the range in size for which the information source's LOP is considered to be similar in size to that of the node's LOR could range from of the order of twice the size of the LOR down to of the order of half of the size of the LOR.

If the LOP is found not to be similar in size in accordance with the similarity function applied, it is determined whether the LOR is significantly larger, step 208. If so, the advertise request, along with the item details object, is passed to each of the node's children which have an LOR intersecting with the LOP of the request, step 210. If no children currently exist for the node, the items details are indexed at the current node, to be passed down if the node subsequently divides.

Otherwise, the request is passed to the parent of the node, step 212. As the parent node has a locality of responsibility which includes that of the upwardly passing node, the parent node, or other parent nodes higher up in the indexing network will be able to accept the advertise-in-locality request.

If in step 206 the locality of pertinence and the locality of relevance are found to be similar in size by the node receiving the advertise request, the node places the item details object in its locality index, to be stored for future retrieval by personal agents interacting with the indexing network, step 214.

The item details object for an information source contains an attribute which specifies a propagation characteristic of the information. Namely, this propagation attribute specifies whether the advertise request is to be propagated to a level below the level at which the LOP and LOR are similar in size, and if so, the number of levels to which the item details are to be propagated. Thus, the item details are provided with one of the following possible propagation categories:

1. Propagate fully. The item details are passed down to be indexed at child nodes at every level in the network below the node at which the LOP and LOR are similar in size.
2. Bounded-propagate. The item details are passed down to be indexed at child nodes at every level until a more location-specific information source relating to the same subject-matter is indexed.
3. Normal. Such item details are not propagated down the indexing network.

To give an example, information such as health and safety notices for a building may be defined with a locality of pertinence corresponding with the whole area of the building, and a bounded-propagate property, such that the item details for the information source will be passed down the indexing network until a node covering a more specific locality, such as for example a laboratory room, at which more specific health and safety instructions are required.

As a further example, notices regarding the opening times of a building may be defined to have a locality of pertinence corresponding with that of the building, and with a propagate fully property, so that such a notice is passed down to all nodes having localities of responsibility within the building. On the other hand, high level information, such as the location of the building in the context of a larger site, may be defined with a locality of pertinence equal to that of the building, and a normal category, so that the information is only accessible at nodes having localities of responsibility which are relatively large.

Thus, the item details are propagated down the indexing network in accordance with the specified propagation characteristics, steps 216 and 218.

Next, in step 220, the node initially in receipt of the advertise request checks the localities of responsibility of its related nodes which have adjacent localities of responsibility, in order to determine whether the LOP specified in the item details object intersects with the LOR or these adjacent nodes. If so, the node passes the advertise request to the adjacent nodes having intersecting LORs, step 222. These adjacent nodes then proceed to step 206 in the procedure illustrated in FIG. 7.

By repeating the procedure illustrated in FIG. 7 for each information agent, the indexing network nodes are populated with item details objects at the appropriate locational specificity.

Figure 8:
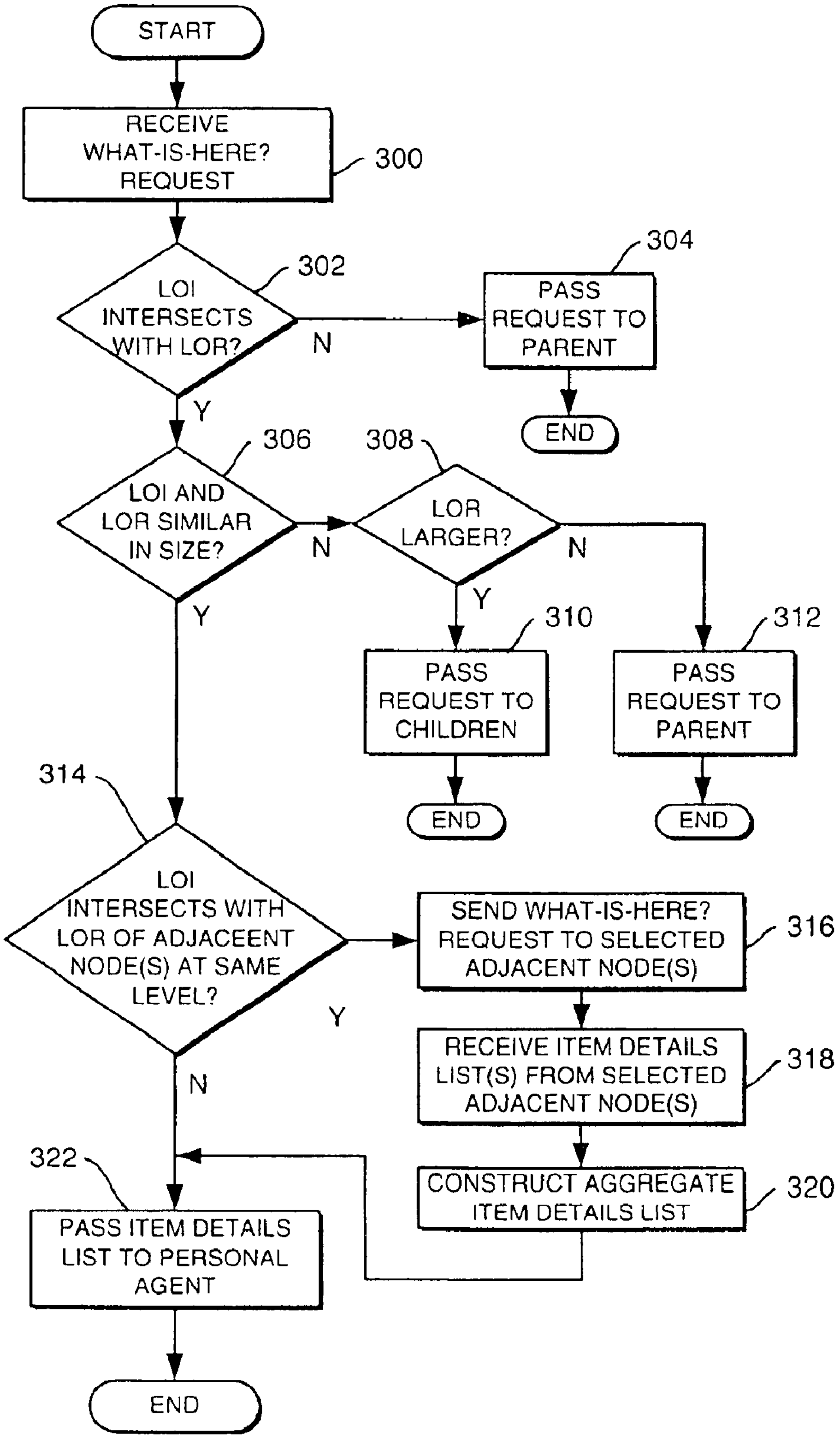

Once the locality indexes of the indexing network is populated with item details objects, the corresponding information sources may be accessed by personal agents in a location-specific manner in accordance with the procedure illustrated in FIG. 8.

In order to access the indexing network, a personal agent transmits a what-is-here? request to a gateway node in the indexing network with which the personal agent is set to interact, passing across data defining a locality of interest (LOI) of the user for which the personal agent is acting. This locality is specified in the form of Cartesian coordinates and parameters defining its size and shape.

The LOI of the user may be obtained in two ways. First, the user may specify a locality of interest via the terminal which the user is currently using, which is then passed on to the user's personal agent. This locality of interest is not necessarily related to the current location of the user.

Secondly, an LOI may be derived from the tracking information received from a location updater device, via the corresponding location updater object, which provides the current location, speed and direction of travel of the user. The LOI may be derived from each of these parameters. In the case of a stationary user, the LOI is defined by default to be centred at the current location of the user, and to have a size equal to the locality of responsibility of the lowest level node in the indexing network which covers the current location of the user, thereby to ensure access to the most location-specific information. The stationary user may however request, via their current terminal, a locality of interest which is larger than this default LOI. The LOI of the stationary user is defined by default to have a circular outline.

In the case of a travelling user, the speed and direction characteristics signalled by the user's location updater device is used to define the user's LOI differently. Namely, the LOI is centred at a point offset from the current location of the user in the direction of travel of the user, the distance increasing with the speed of travel of the user. The size of the locality of interest of the user is also increased, to increase the level of generality of the information derived from the indexing network. Finally, the shape of the LOI is altered to extend the LOI to a greater extent in the direction of travel of the user then in a direction normal to the direction of travel.

The setting of the LOI of the user is carried out by the user's personal agent, which is continually updated with the user's current location, speed and direction of travel. In the case of a mobile location updater, such as the positioning signal receiver described above, a location update message is transmitted to the personal agent when the user carrying the location updater device moves a predefined threshold distance since a previous location update. The personal agent proceeds to generate a what-is-here? request when the location of the user has altered a significant degree in relation to the size of the user's current LOI.

Referring again to FIG. 8, on receipt of the what-is-here? request (step 300), the receiving node applies an intersection function method to the LOI passed in the request, to determine whether the LOI intersects with the LOR of the node, step 302. If there is no intersection, the receiving node passes the request, along with the LOI of the request, to its parent node, step 304. Alternatively, if there is no intersection the node may compare the LOI with the LOR of any related adjacent nodes, passing the request to the best locality match, or passing the request to the parent if no good match is found.

If the LOR and the LOI are found to intersect, the node proceeds to apply a similarity function, such as that described in relation to FIG. 7, to determine whether the LOI of the user and the LOR of the node are similar in size, step 306.

If the LOI is found not to be similar in size in accordance with the similarity function applied, it is determined whether the LOR is significantly larger, step 308. If so, the what-is-here? request, along with the specified LOI, is passed to each of the node's children which have an LOR intersecting with the LOI of the request, step 310.

Otherwise, the LOI is significantly larger in size than the LOR, and the request is passed to the parent of the node, step 312. As the parent node has a locality of responsibility which includes that of the upwardly passing node, the parent node, or other parent nodes higher up in the indexing network will be able to accept the what-is-here? request.

If the LOI of the user and the LOR of the node subject to the request are similar in size, the receiving node further determines whether the user's LOI intersects with the LORs of its related nodes which exist at the same level in the indexing network, being either sibling nodes or cousin nodes, step 314.

If the LOI also intersects with the LORs of any adjacent nodes of equal level, the receiving node transmits a what-is-here? request to each of the found adjacent nodes, step 316. These selected nodes return an item details list consisting of the item details objects stored in their locality indexes, step 318. The receiving node then proceeds to construct a full item details list which includes the item details objects from adjacent nodes having LORs which intersect with the LOI specified in the original request, and the item details objects held in its own locality index, step 320.

If the node finds no adjacent nodes with LORs which intersect with the LOI of the user, the item details list to be transmitted consists of item details objects held solely in the receiving node's locality index.

Finally, the item details list is passed to the requesting personal agent, step 322.

On receipt of an item details list, the personal agent performs its selection algorithm, using the user's preference data, in order to filter out information objects representing information sources which are considered to be of low potential interest to the user, and to produce a shortlist of the remaining information objects which are transmitted to the terminal agents of the terminal currently serving the user, for the presentation of summary information to the user at their terminal. On reviewing the summary information, the user is able to select information sources which are of interest, and access information held in the information sources, by means of the system address for the information source specified in the corresponding information object now held in the terminal agent.

Information agents may be configured to act on behalf of terminals accessible within the geographical area covered by the indexing network. In this manner, a personal agent acting on behalf of the user may locate terminals, using a what-is-here? request, to identify terminals accessible in the immediate locality of the user. Furthermore, the information stored in the corresponding item details object representing the terminal may specify the formats of data and transmission protocols accepted by the terminal, thereby allowing the personal agent to select a terminal appropriate for a particular type or format of information to be received by the user.

In addition to information agents and terminal agents, personal agents may also advertise within the indexing network. In order to do this, each personal agent is provided with an item details object to pass over to the indexing network for indexing at an appropriate level. The item details object for the personal agent include the following data storage attributes:

1. The gateway node at which the personal agent is currently set to communicate with the indexing network.
2. The name of the user.
3. The current location of the user.
4. A locality of pertinence (LOP) for the user. This may be derived either from the locality of interest (LOI) currently set for the user, which is dependent on the current location, speed and direction of travel of the user, and/or may include a "home" locality of pertinence for the user. The locality is specified in the form of Cartesian coordinates and parameters defining its size and shape.
5. An e-mail address for the user.
6. A current address for the personal agent.
7. A system address for an information source associated with the user, for example the URL of a personal Web page.

In order to index its information details object by locality, the personal agent transmits an advertise-in-locality request containing the item details object to the personal agent is gateway node, which then proceeds with the steps described in relation to FIG. 7 in order to index the user's personal item details object within the indexing network.

The indexing network is provided with a name index, consisting of individual databases distributed between the nodes of the network. In order to feature in the name index, an agent transmits an advertise-by-name request to its gateway node.

Figure 9:
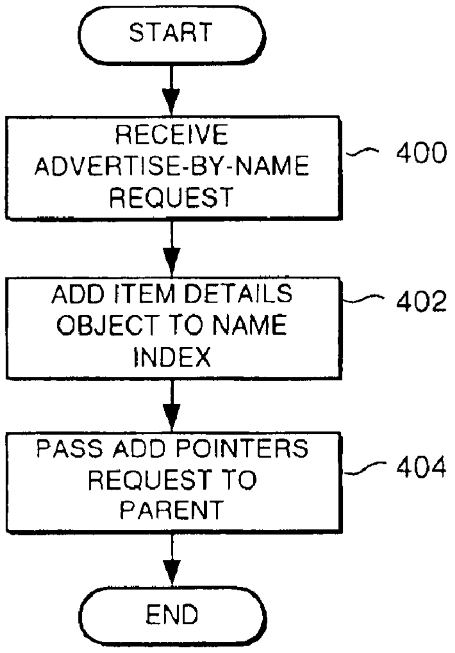

FIG. 9 illustrates the procedure followed by a gateway node in receipt of an advertise-by-name request from an agent previously not indexed in the system. Along with the request, the agent passes its current item details object to the node. On receipt, step 400, the gateway node stores the passed item details object, in its name index, step 402. A request to add a pointer, associated with a unique name for the agent, is passed to the parent node, step 404. The parent node adds this pointer to its name index, and then passes a similar request to its parent node, which repeats the same until the root node is reached.

Thus, when an agent is advertised-by-name within the indexing network, a reference to the gateway node will be present at a directly related node at each level in the indexing network above the gateway node, at which the agent's item details object is held.

Figure 10:
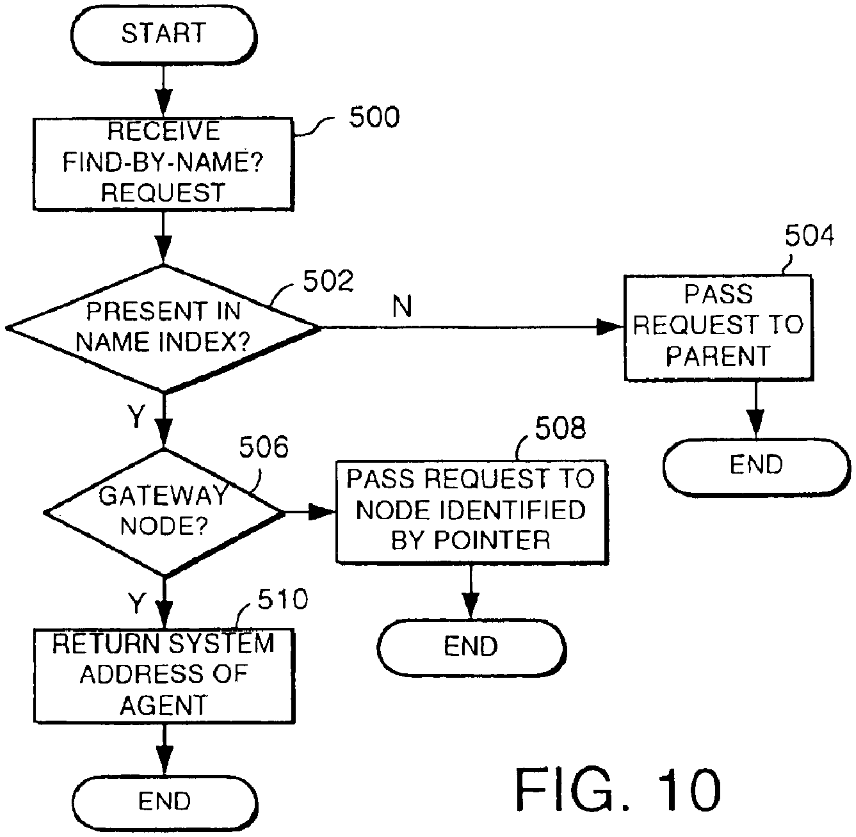

In order to find an agent, the procedure illustrated in FIG. 10 is followed by a node requested to find the agent by name, step 500. The request need only contain the unique name of the agent.

If a reference to the agent identified by the unique name in the find-by-name request is not present in the name index of the node receiving the request, step 502, it passes the request directly to its parent, step 504, which proceeds from step 500.

Once a node in receipt of a find-by-name request does have a reference to the identified agent in its name index, unless the node is the gateway node, step 506, it passes the request to the node immediately below it identified by the pointer held in its name index, step 508. Once the request reaches the gateway node, it returns the system address of the agent to the original requesting party, step 510.

Figure 11:
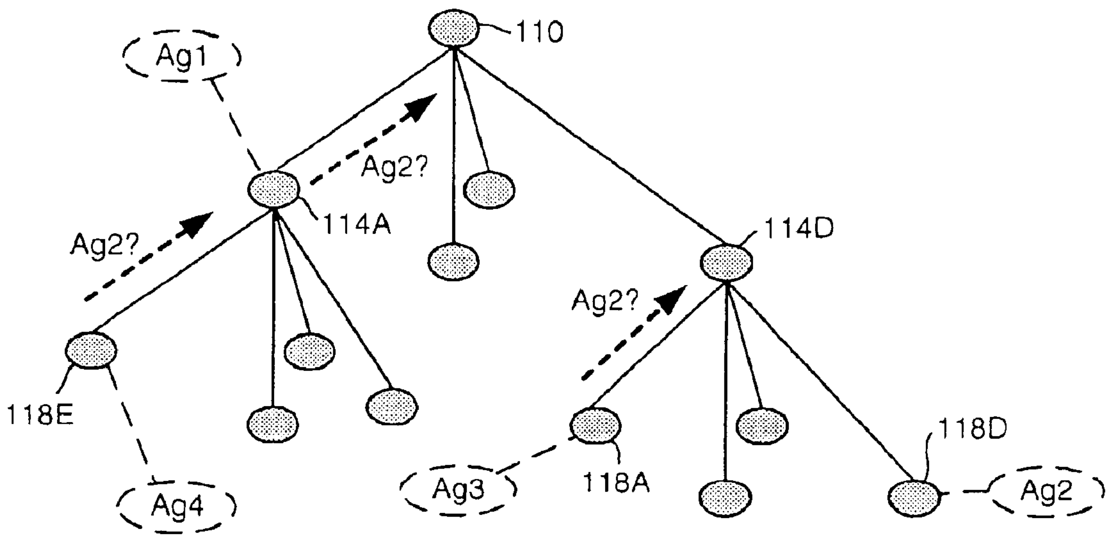
FIG. 11 is a schematic drawing illustrating the routing of agent-finding requests within the indexing network of the present invention.

FIG. 11 illustrates the way in which the name index feature operates. In the example shown, a first agent, Ag1 is set with a gateway node at level 2, node 114A. Second, third and fourth agents, Ag2, Ag3 and Ag4 are set with gateway nodes at level 3, nodes 118D, 118A and 118E, respectively.

FIG. 11 illustrates each of agents Ag1, Ag3 and Ag4 attempting to find a reference to agent Ag2 in the network. Agent Ag3 is set with a gateway node which is a sibling node of the gateway node which agent Ag2 is set to, and the find-by-name request transmitted by agent Ag3 to its gateway node is propagated only to its parent node, at which a pointer to agent Ag2 will be found in the name index of the node.

The find-by-name request transmitted by agent Ag1 will be passed from its gateway node, node 114A, to the root node 110, at which point a pointer to the item details object of agent 2 is present in a name index.

A find-by-name request transmitted by agent Ag4 to its gateway node, node 118E, will be passed on by that node, and the parent node 114A, in turn, which each do not have references to agent Ag2 within their name indexes. The find-by-name request is then passed down from the root node 110 in accordance with the pointers stored in the name indexes of the handling nodes, until it reaches the gateway node of agent Ag2, which returns the system address of agent Ag2 to agent Ag4.

Thus, each of the categories of agent which interact directly with the indexing network, being the information agent, the personal agent and the terminal agent, are set to communicate with a particular gateway node of the indexing network. As the indexing network consists of a distributed network which extends over a plurality of distributed computing nodes, such as the DPE Servers DS described in relation to FIG. 1, and since the agents in question may be mobile, a procedure is defined whereby an agent may move and alter the gateway node with which the agent is set to communicate.

The gateway node moving procedure may be initiated either by the agent itself or by a node of the indexing network. For example, if an agent detects that response delays in communications with the currently set gateway node have become excessive, the agent may initiate a move to a node having a locality of responsibility which is closer to, or intersecting with, the locality of pertinence or locality of interest of the agent. Alternatively, if a particular node of the indexing network detects overloading, it may instruct certain of the agents currently communicating with the node as a gateway node to move to an adjacent node.

Figure 12:
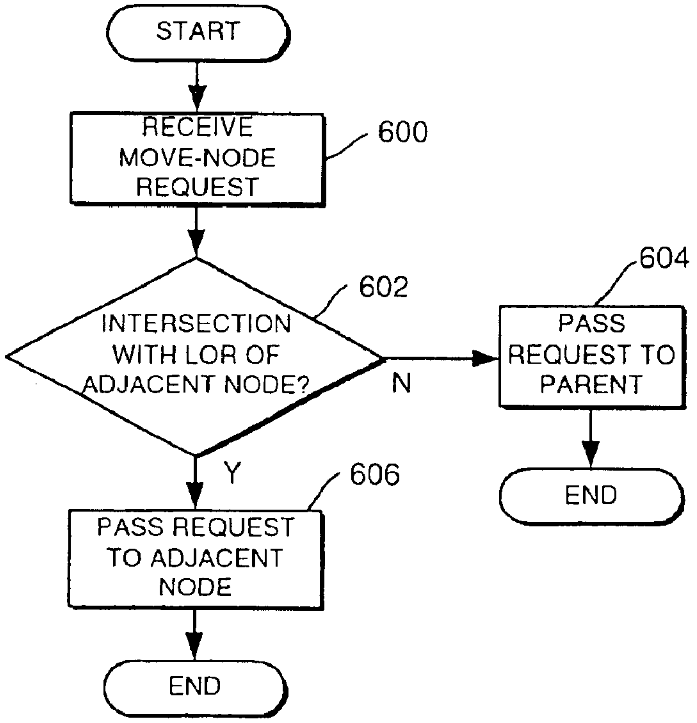

FIG. 12 illustrates the steps carried out by the gateway node of an agent on receipt of a move-node request from the agent, step 600.

The gateway node first determines whether the LOI or LOR of the requesting agent intersects with the LOR of an adjacent node, step 602. If no such intersection exists, the gateway node passes the request to its parent node, step 604.

Otherwise, the gateway node passes the move-node request to the most appropriate adjacent node having an LOR which intersects with the LOP or LOI of the requesting agent (step 606).

Figure 13:
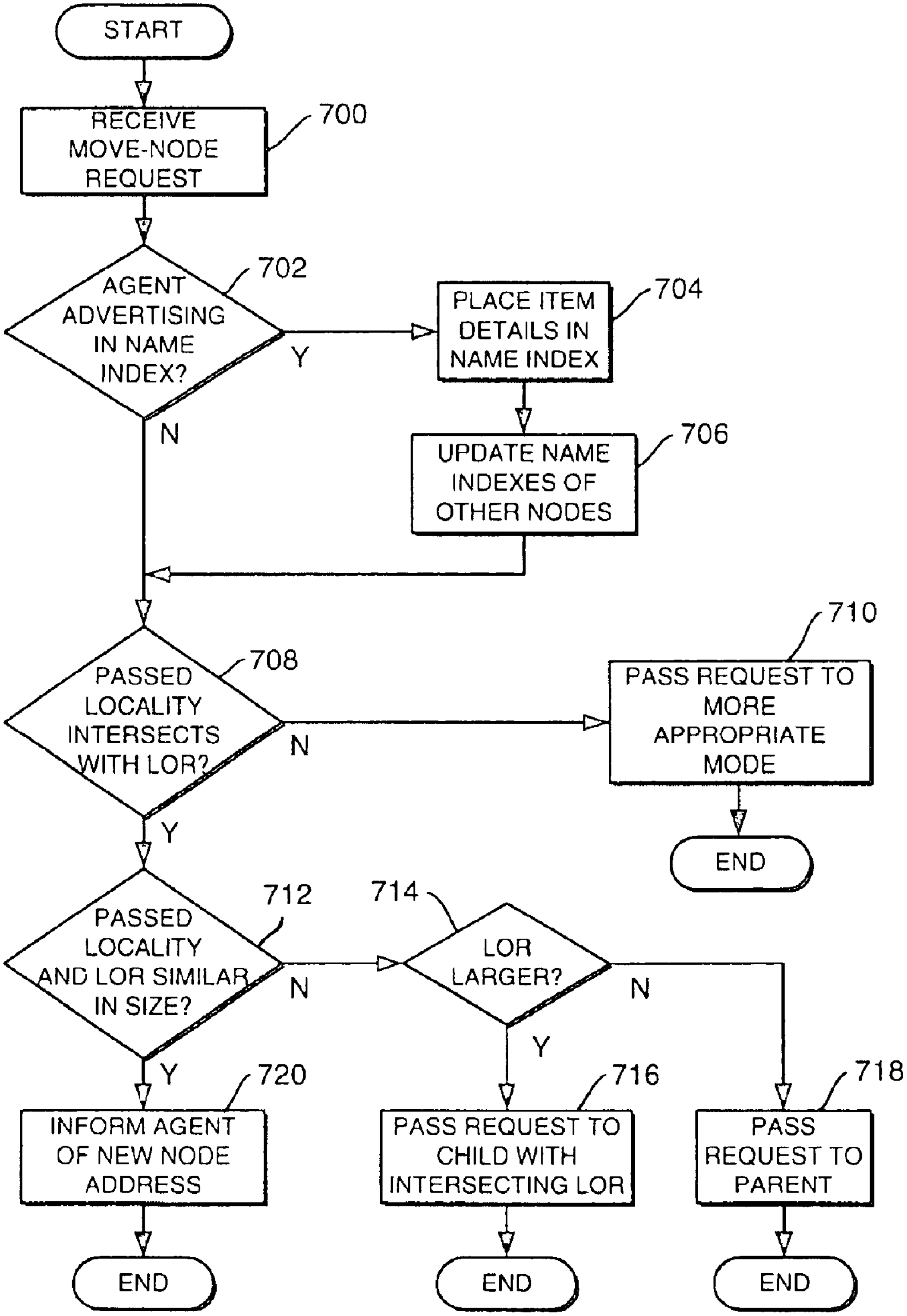

Referring to FIG. 13, when a particular node receives a move-node request for an agent from another node, step 700, the receiving node first determines whether the agent specified in the move-node request is advertising within the indexing network by name, step 702. This information will be found in the item details object passed with the move-node request, which item details object contains a flag indicating whether or not the agent is advertising-by-name.

If the agent is advertising-by-name, it is necessary to ensure the consistency of the name indexes when an agent is moving. Accordingly, the receiving node places the item details object within its own name index, step 704. The receiving node must also initiate a process whereby the name indexes of other nodes are updated, step 706. The receiving node follows the following rules when updating the name indexes of other nodes:

1. If the move-node request is received from a parent node, no updating is required.
2. If the move-node request is received from a child node, the receiving node transmits a remove-by-name request to the sending node, which results in the deletion of the corresponding item details object from the sending node's name index.
3. If the move-node request is received from a sibling node, the receiving node transmits a remove-by-name request to the sending node, and transmits a request to its parent to update the pointer in its name index.
4. If the move-node request is received from a cousin node, the receiving node transmits a remove-by-name request to the sending node, and transmits a request to its parent node to add a pointer in its name index and to propagate the request upwards until a previous entry for the agent is found, and thence to propagate a request downwards to remove all previous pointers which are now incorrect.
5. If the move-node request is received from an uncle node, the receiving node transmits a remove-by-name request to the sending node. The receiving node also transmits an advertise-by-name request its parent nodes including a request to add and update name index pointers which is propagated up to and including N+1 nodes above the receiving node's location, where N is the depth of the uncle minus the depth of the receiving node.
6. If the move-node request is received from a nephew node, a request is sent to the node's parent to update the pointer in the parent node's name index. A remove-by-name request is transmitted to the sending node, including a request for the removal of pointers from the name indexes of the sending node's parents to a level of N above the sending node where N is the depth of the nephew node minus the depth of the receiving node.

Once the name indexes of the other nodes in the network are updated, the receiving node applies the intersection function to determine whether the locality passed in the request intersects with the LOR of the receiving node, step 708. This is not necessarily the case, if the request was received from a child node. If no intersection is present, the move-node request is passed on to a more appropriate node, which is determined as per step 602 described in relation to FIG. 12, step 710.

If an intersection is found to occur, the receiving node applies a size similarity function to determine whether the locality passed in the move-node request is similar in size to its own LOR, step 712. If not, the node determines whether its LOR is significantly larger than the passed locality, step 714, and if so it passes the move-node request to a child node with an intersecting LOR, step 716. Otherwise, the move-node request is passed upwards to the parent node, step 718.

Finally, if the node receiving the move-node request is an appropriate gateway node, the requesting agent is informed of the system address of the new node with which the agent is now set to communicate, step 720.

What is claimed is:

1. A method of storing and/or retrieving location-based information, the method comprising:

storing, in a distributed network of data storage devices accessible simultaneously from a plurality of remote user terminals, data defining a plurality of first localities in relation to which information storage is accessible; and selecting ones of said first localities to represent second localities for which information is to be stored and/or retrieved such that:

i) said first and second localities bear a predetermined locational relationship; and ii) said first and second localities bear a predetermined relationship in size.

2. A method according to claim 1, wherein said first localities are selected such that said first and second localities share at least one geographical location.

3. A method according to claim 1, wherein said first localities are selected such that said first and second localities are similar in size.

4. A method according to claim 1, wherein said data defines access nodes which include a node representing a relatively large locality and one or more nodes representing one or more relatively small localities which overlap said relatively large locality.

5. A method according to claim 4, wherein a plurality of said nodes representing relatively small localities form divisions of said relatively large locality.

6. A method according to claim 4, wherein said nodes are interlinked in a network structure.

7. A method according to claim 6, wherein said network structure is a hierarchical structure.

8. A method according to claim 7, wherein said nodes are interlinked in parent/child relationships.

9. A method according to claim 8, wherein said interlinking comprises a node holding a reference whereby the related node may be accessed.

10. A method according to claim 7, wherein said nodes are interlinked in sibling relationships.

11. A method according to claim 7, wherein said nodes are interlinked in uncle/nephew relationships.

12. A method according to claim 7, wherein said nodes are interlinked in cousin/cousin relationships.

13. A method according to claim 4, comprising altering a distribution of said nodes amongst said data storage devices.

14. Apparatus for storing location-based information in accordance with the method of claim 1.

15. A method according to claim 1, wherein said network of data storage devices comprises a plurality of servers interconnected by data links and forming a distributed processing environment.

16. A method of storing location-based information, the method comprising:

defining, in a distributed network of data storage devices accessible simultaneously from a plurality of remote user terminals, a plurality of data access nodes each of which is responsible for a predefined locality, said plurality of nodes including a higher level node responsible for a larger locality and lower level nodes responsible for smaller localities which overlap said larger locality, indexing references to information sources containing locality-specific information at said data access nodes, different information source references being indexed at said higher level node than at said lower level nodes; and transmitting said references from said indexing nodes on request.

17. A method according to claim 16, wherein at least one information source reference is commonly indexed at said higher level node and said lower level nodes.

18. A method of storing location-based information, the method comprising:

defining, in a distributed network of data storage devices accessible simultaneously from a plurality of remote user terminals, a plurality of data access nodes each of which is responsible for a predefined locality;

indexing references to information sources containing locality-specific information at said data access nodes, one or more of such references being repeatedly indexed at different of said nodes; and transmitting said references from said data access nodes on request.

19. A method of retrieving information for presentation to a user, the method comprising:

defining a locality of interest to the user in dependence on both a location of the user and a speed of travel of the user; and selecting, in a distributed network of data storage devices accessible simultaneously from a plurality of remote user terminals, information sources from which locality-specific information may be retrieved, on the basis of the defined locality of interest.

20. A method according to claim 19, wherein the extent of the locality of interest of the user is altered in dependence on the speed of travel.

21. A method according to claim 20, wherein the extent of the locality of interest increases with the speed of travel.

22. A method according to claim 19, wherein the locality of interest is altered in dependence on the direction of travel of the user.

23. A method according to claim 19, comprising deriving parameters relating to the travel of the user from a positioning signal receiver travelling with the user.

24. Apparatus for storing location-based information, said apparatus comprising a distributed network of data storage devices accessible simultaneously from a plurality of user terminals and defining data access nodes which are referentially interlinked, each said data access node being provisioned with a locality for which it is responsible, and means for comparing the size of an input locality in relation to which information storage is to be accessed and a locality for which the access node is responsible.

25. Apparatus according to claim 24, wherein said apparatus is reconfigurable by the addition of, or the removal of, one or more of said data access nodes, so as to transfer responsibility from or to one or more other nodes with localities of responsibility sharing at least one geographical location.

* * * * *